(12) United States Patent
Iino et al.

(10) Patent No.: US 11,004,211 B2
(45) Date of Patent: May 11, 2021

(54) IMAGING OBJECT TRACKING SYSTEM AND IMAGING OBJECT TRACKING METHOD

(71) Applicant: Mitsubishi Electric Corporation, Tokyo (JP)

(72) Inventors: Susumu Iino, Tokyo (JP); Junji Sukeno, Tokyo (JP); Masahide Koike, Tokyo (JP); Satoshi Michihata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/632,390

(22) PCT Filed: May 8, 2018

(86) PCT No.: PCT/JP2018/017703
§ 371 (c)(1),
(2) Date: Jan. 20, 2020

(87) PCT Pub. No.: WO2019/044038
PCT Pub. Date: Mar. 7, 2019

(65) Prior Publication Data
US 2020/0234452 A1 Jul. 23, 2020

(30) Foreign Application Priority Data
Aug. 30, 2017 (JP) .............................. JP2017-165437

(51) Int. Cl.
*G06T 7/20* (2017.01)
*G06K 9/00* (2006.01)
*H04N 7/18* (2006.01)

(52) U.S. Cl.
CPC ............. *G06T 7/20* (2013.01); *G06K 9/00228* (2013.01); *H04N 7/181* (2013.01); *G06T 2207/30241* (2013.01)

(58) Field of Classification Search
CPC ............. G06T 7/20; G06T 2207/10016; G06T 2207/30196; G06T 2207/30201;
(Continued)

(56) References Cited

U.S. PATENT DOCUMENTS

2009/0268028 A1\* 10/2009 Ikumi .................... H04N 7/181
348/150
2012/0045096 A1 2/2012 Naito et al.
(Continued)

FOREIGN PATENT DOCUMENTS

JP 2004-072628 A 3/2004
JP 2009-265922 A 11/2009
(Continued)

OTHER PUBLICATIONS

International Search Report and Written Opinion dated Aug. 7, 2018 for PCT/JP2018/017703 filed on May 8, 2018, 8 pages including English Translation of the International Search Report.
(Continued)

*Primary Examiner* — Thai Q Tran
*Assistant Examiner* — Stephen R Smith
(74) *Attorney, Agent, or Firm* — Xsensus LLP (57) ABSTRACT

An imaging object tracking system includes an entrance/exit detection camera to take an image of an entrance/exit detection area where an imaging object enters and exits, an entrance/exit detection upper sensor to detect the imaging object being imaged by the entrance/exit detection camera, at least one upper sensor disposed so as to overlap a part of the detection area for detecting the imaging object with an area where the entrance/exit detection upper sensor detects
(Continued)

the imaging object, an initial position estimation unit to estimate an initial position of the imaging object on the basis of positional coordinates of the imaging object in a two-dimensional image taken by the entrance/exit detection camera and three-dimensional coordinate information of the entrance/exit detection area, an upper position detection unit to detect a position of the imaging object seen from an upper side thereof, an initial motion path generation unit to generate an initial motion path, and a tracking unit to generate a following motion path by adding a position of the imaging object to the initial motion path.

11 Claims, 7 Drawing Sheets

(58) Field of Classification Search
CPC . G06T 2207/30232; G06T 2207/30241; G06T 7/292; G06T 7/80; H04N 7/181; H04N 7/188; G06K 9/00; G06K 9/00228; G06K 9/00369; G06K 9/00771; G08B 13/19641; G08B 25/00
USPC ........ 348/159, 143, 150, 135, 169; 382/118, 382/103, 203; 342/450; 340/555
See application file for complete search history.

(56) References Cited

U.S. PATENT DOCUMENTS

| 2013/0002869 A1* | 1/2013 | Yuasa | H04N 5/247 348/143 |
|---|---|---|---|
| 2016/0224829 A1* | 8/2016 | Chou | G06T 7/11 |

FOREIGN PATENT DOCUMENTS

| JP | 2010-257449 A | 11/2010 | |
|---|---|---|---|
| WO | 2011/010490 A1 | 1/2011 | |
| WO | 2014009290 A1 * | 1/2014 | G06K 9/00 |

OTHER PUBLICATIONS

Iino, S., et al., "A Method of Tracking Humans Moving Across Fields of Camera-View," Forum on Information Technology 2017 by Information Processing Society of Japan and The Institute of Electronics, Information and Communication Engineers, Sep. 5, 2017, pp. 259-260.

* cited by examiner

| Item Number | Data contents | Data format | Data size |
|---|---|---|---|
| 1 | Area information | unsigned int 16bit | 2 |
| 2 | Number of flow lines : N | unsigned int 32bit | 4 |
| 3 | Starting address of information on flow line ID : 1 | unsigned int 32bit | 4 |
| 4 | Starting address of information on flow line ID : 2 | unsigned int 32bit | 4 |
| ... | ... | ... | ... |
| N+2 | Starting address of information on flow line ID : N | unsigned int 32bit | 4 |
| N+3 | ID of imaging object (Information on flow line ID : 1) | unsigned int 32bit | 4 |
| N+4 | Number of position coordinates : $m_1$ | unsigned int 32bit | 4 |
| N+5 | Last update time of flow line ID : 1 | unsigned int 32bit | 4 |
| N+6 | X coordinate of position coordinate ID:1 | float | 4 |
| N+7 | Y coordinate of position coordinate ID:1 | float | 4 |
| N+8 | Z coordinate of position coordinate ID:1 | float | 4 |
| N+9 | X coordinate of position coordinate ID:2 | float | 4 |
| N+10 | Y coordinate of position coordinate ID:2 | float | 4 |
| N+11 | Z coordinate of position coordinate ID:2 | float | 4 |
| ... | ... | ... | ... |
| $N+3+3 \times m_1$ | X coordinate of position coordinate ID:$m_1$ | float | 4 |
| $N+3+3 \times m_1+1$ | Y coordinate of position coordinate ID:$m_1$ | float | 4 |
| $N+3+3 \times m_1+2$ | Z coordinate of position coordinate ID:$m_1$ | float | 4 |
| $N+3+3 \times m_1+3$ | ID of imaging object (Information on flow line ID : 2) | unsigned int 32bit | 4 |
| $N+3+3 \times m_1+4$ | Number of position coordinates : $m_2$ | unsigned int 32bit | 4 |
| $N+3+3 \times m_1+5$ | Last update time of flow line ID : 1 | unsigned int 32bit | 4 |
| $N+3+3 \times m_1+6$ | X coordinate of position coordinate ID:1 | float | 4 |
| $N+3+3 \times m_1+7$ | Y coordinate of position coordinate ID:1 | float | 4 |
| $N+3+3 \times m_1+8$ | Z coordinate of position coordinate ID:1 | float | 4 |
| $N+3+3 \times m_1+9$ | X coordinate of position coordinate ID:2 | float | 4 |
| $N+3+3 \times m_1+10$ | Y coordinate of position coordinate ID:2 | float | 4 |
| $N+3+3 \times m_1+11$ | Z coordinate of position coordinate ID:2 | float | 4 |
| ... | ... | ... | ... |
| $N+3+3 \times m_1+3 \times m_2$ | X coordinate of position coordinate ID:$m_2$ | float | 4 |
| $N+3+3 \times m_1+3 \times m_2+1$ | Y coordinate of position coordinate ID:$m_2$ | float | 4 |
| $N+3+3 \times m_1+3 \times m_2+2$ | Z coordinate of position coordinate ID:$m_2$ | float | 4 |
| ... | ... | ... | ... |
| | ID of imaging object (Information on flow line ID : N) | unsigned int 32bit | 4 |
| | Number of position coordinates : $m_n$ | unsigned int 32bit | 4 |
| | Last update time of flow line ID : N | unsigned int 32bit | 4 |
| | X coordinate of position coordinate ID:1 | float | 4 |
| | Y coordinate of position coordinate ID:1 | float | 4 |
| | Z coordinate of position coordinate ID:1 | float | 4 |
| | X coordinate of position coordinate ID:2 | float | 4 |
| | Y coordinate of position coordinate ID:2 | float | 4 |
| | Z coordinate of position coordinate ID:2 | float | 4 |
| ... | ... | ... | ... |
| | X coordinate of position coordinate ID:$m_n$ | float | 4 |
| | Y coordinate of position coordinate ID:$m_n$ | float | 4 |
| | Z coordinate of position coordinate ID:$m_n$ | float | 4 |

IMAGING OBJECT TRACKING SYSTEM AND IMAGING OBJECT TRACKING METHOD

CROSS-REFERENCE TO RELATED APPLICATIONS

The present application is based on PCT filing PCT/JP2018/017703, filed May 8, 2018, which claims priority to JP 2017-165437, filed Aug. 30, 2017, the entire contents of each are incorporated herein by reference.

TECHNICAL FIELD

The present invention relates to a tracking technique of an imaging object using surveillance cameras. Especially, it relates to a technique to track an imaging object by detecting the head of an imaging object and generating a motion path of the imaging object.

BACKGROUND ART

Improvement of the surveillance camera system has made a positional tracking of an imaging object in a space possible with a reasonable cost and sufficient accuracy. In a positional tracking system of an imaging object, the position of the imaging object is estimated to generate motion path data of the imaging object by continuously integrating detection results obtained from a plurality of cameras using a visual volume intersection method (for example, Patent Document 1).

PRIOR ART DOCUMENTS

Patent Document

Patent Document 1: Unexamined Patent Application Publication JP, 2009-265922

SUMMARY OF INVENTION

Technical Problem

In a conventional imaging object tracking system, a plurality of cameras always need to take images of one imaging object in order to obtain information such as three-dimensional coordinates of the imaging object. Thus, a problem arises in that a plurality of cameras is required for one imaging object and a large number of cameras need to be arranged in a surveillance area.

The invention has been made to solve the above-mentioned problem, and provides an imaging object tracking system that can be configured with a small number of cameras arranged in the surveillance area for tracking the imaging objects.

Solution to Problem

An imaging object tracking system according to the present invention includes an entrance/exit detection camera to take an image of an entrance/exit detection area where an imaging object enters and exits, an entrance/exit detection upper sensor installed in an upper side of the imaging object to detect the imaging object being imaged by the entrance/exit detection camera, at least one upper sensor installed in an upper side of the imaging object and disposed so as to overlap a part of the detection area for detecting the imaging object with an area where the entrance/exit detection upper sensor detects the imaging object, an initial position estimation unit to estimate an initial position of the imaging object on the basis of positional coordinates of the imaging object in a two-dimensional image taken by the entrance/exit detection camera and three-dimensional coordinate information of the entrance/exit detection area, an upper position detection unit to detect a position of the imaging object seen from an upper side thereof on the basis of an image detected by the entrance/exit detection upper camera or the at least one upper sensor, an initial motion path generation unit to generate an initial motion path by linking a position of the imaging object corresponding to the initial position of the imaging object and a position closest in distance from the starting point from among the positions of the imaging object; and a tracking unit to generate a following motion path by adding a position of the imaging object to the initial motion path.

Advantageous Effects of Invention

In the invention, on the basis of positional coordinates detected by an entrance/exit detection camera and three-dimensional coordinate information of the entrance/exit detection area, three-dimensional coordinates of the initial position of an imaging object is estimated and the three-dimensional coordinates of the initial position of the imaging object and the positional coordinates detected by an entrance/exit detection upper sensor are associated with each other. Therefore, it is possible to obtain an imaging object tracking system that can be configured with a small number of cameras arranged in the surveillance.

BRIEF DESCRIPTION OF DRAWINGS

FIG. 5 is a table showing an example of motion path information.

DESCRIPTION OF EMBODIMENTS

Embodiment 1

Figure 1:
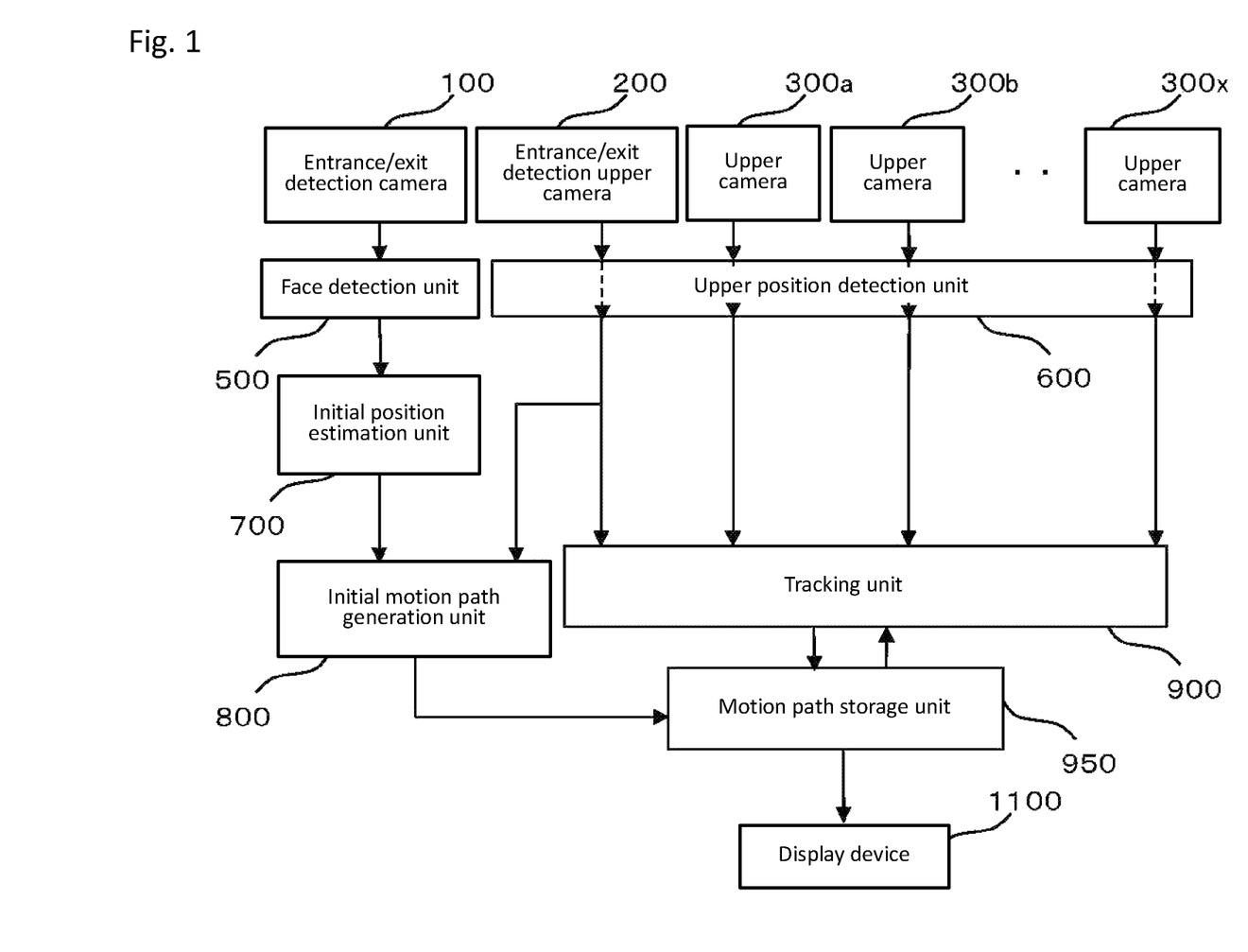
FIG. 1 is a block diagram showing a basic configuration of an imaging object tracking system according to Embodiment 1 of the present invention.
Figure 2:
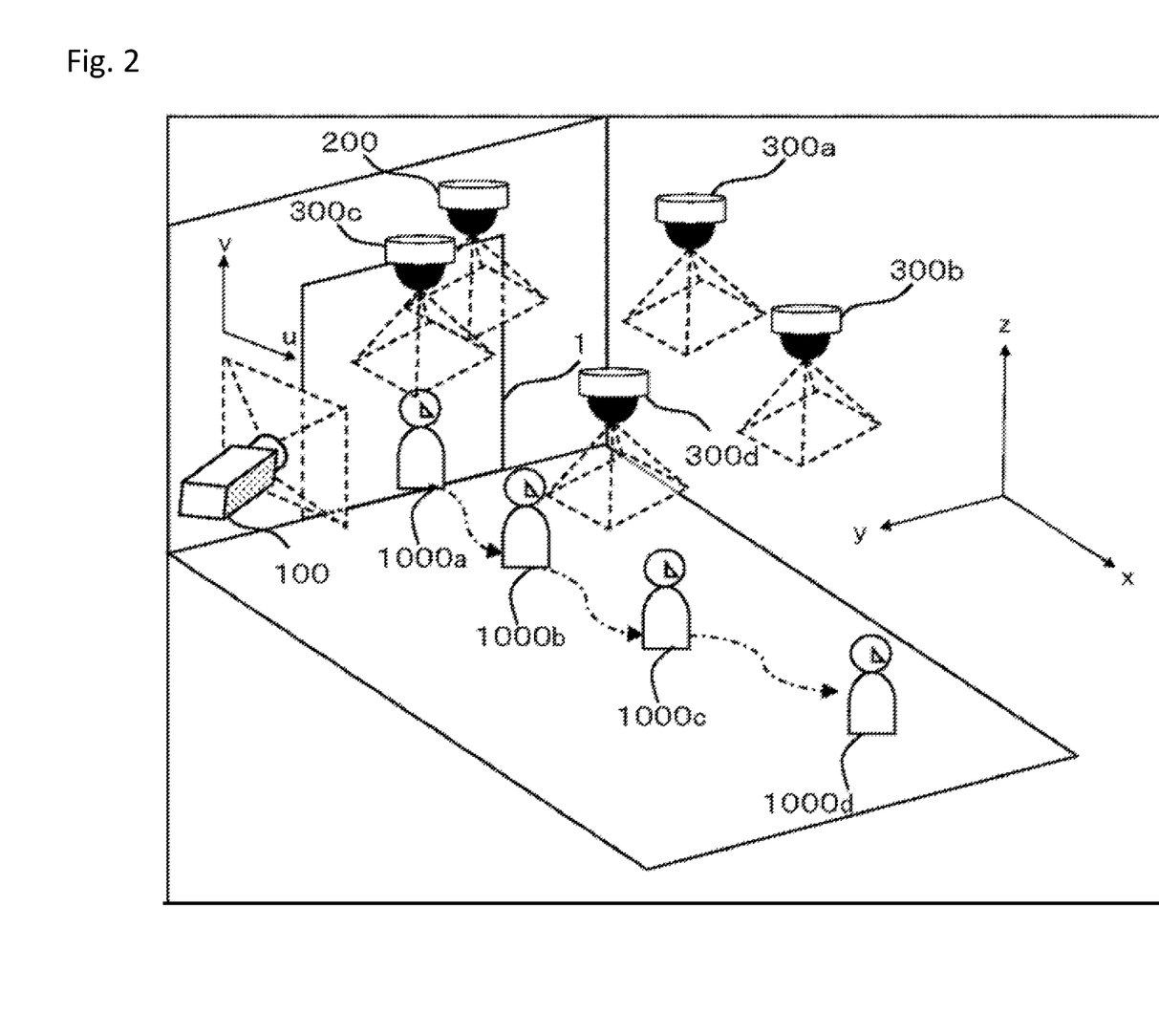
FIG. 2 is an explanatory diagram showing an arrangement of an entrance/exit detection camera, an entrance/exit detection upper camera, and upper cameras according to Embodiment 1 of the present invention.

FIG. 1 is a block diagram showing a basic configuration of an imaging object tracking system according to Embodiment 1 of the present invention. FIG. 2 is an explanatory diagram showing an arrangement of an entrance/exit detection camera 100, an entrance/exit detection upper camera 200, and upper cameras 300 according to Embodiment 1 of the present invention. In FIG. 1, the entrance/exit detection camera 100 transmits a taken image to a face detection unit 500 which is to detect the face of a person being an imaging object 1000. The face detection unit 500 transmits the detected positional coordinates in the image to an initial position estimation unit 700. The initial position estimation unit 700 transmits to an initial motion path generation unit 800, the positional coordinates converted into three-dimensional coordinates. The entrance/exit detection upper camera 200 being an entrance/exit detection upper sensor transmits a taken image to an upper position detection unit 600 that is to detect the upper position such as a head of a person being the imaging object 1000. Not limited to the head, the upper position detection unit 600 may also detect another upper body portion, such as a shoulder, of the person being the imaging object 1000. The upper cameras 300 being upper sensors also transmit taken images to the upper position detection unit 600. The upper position detection unit 600 transmits the positional coordinates of the head as the detection result to a tracking unit 900. The entrance/exit detection upper camera 200 and the upper cameras 300 are visible light cameras. The upper position detection unit 600 transmits the positional coordinates of the head to the initial motion path generation unit 800. The initial motion path generation unit 800 transmits initial motion path information to a motion path storage unit 950. The motion path storage unit 950 stores the initial motion path information and transmits the stored motion path information to the tracking unit 900. The motion path storage unit 950 also stores the motion path information generated by the tracking unit 900. The motion path storage unit 950 transmits the motion path information to a display device 1100. Thus, the motion path storage unit 950 stores the initial motion path generated by the initial motion path generation unit 800, outputs the initial motion path to the tracking unit 900, and stores the motion path information generated by the tracking unit 900. In the description of the imaging object tracking system according to Embodiment 1 of the present invention, the space where the cameras are arranged and that covers the imaging areas of the cameras is referred to as target imaging space.

Also, in the description of the present embodiment, it is assumed that the upper cameras 300 or the entrance/exit detection upper camera 200 takes an image for the head.

The entrance/exit detection camera 100 is a camera installed to take the image of the place where the imaging object 1000 enters and exits the target imaging space and generates an image from light incident on the camera according to a perspective projection model in the same way as a general camera does. That is, the entrance/exit detection camera 100 takes the image of the imaging object 1000 according to the perspective projection model. The taken image is transmitted to the face detection unit 500.

In the target imaging space of the entrance/exit detection camera 100, the place where the imaging object 1000 enters and exits the target imaging space is referred to as an entrance/exit detection area. In the present embodiment, the place where the imaging object 1000 enters and exits is an entrance/exit detection area 1. Note that the entrance/exit detection area 1 and the arrangement of the entrance/exit detection upper camera 200 will be described later using FIG. 2. In a case where there may be a plurality of entrance/exit detection areas 1, the same number of the entrance/exit detection cameras 100 as the entrance/exit detection areas 1 is required in the present invention. In that case, the initial position estimation unit 700 calculates the three-dimensional coordinates of an initial position by using the image taken by the entrance/exit detection camera 100, the entrance/exit detection camera 100 being associated with the entrance/exit detection area 1 where the imaging object 1000 enters first.

It suffices that, in the entrance/exit detection area, the entrance/exit detection camera 100 can take an image over the target imaging space, and a size that allows the imaging object to enter and exit is ensured. That is, the entrance/exit detection area may, for example, be something like a gate formed by pillars, and not necessarily be a door or a planer area separated by walls or the like.

The entrance/exit detection upper camera 200 is a camera installed in the upside of the target imaging space to take an image of the imaging object 1000 from the upper side. The imaging area of the entrance/exit detection upper camera 200 partly includes the entrance/exit detection area 1. Therefore, the same number of the entrance/exit detection upper cameras 200 is at least required as the number of the entrance/exit detection cameras 100. The taken image is transmitted to the upper position detection unit 600.

The upper cameras 300 are cameras installed in the upside of the target imaging space, such as on the ceiling, to take an image of the imaging object 1000 from the upper side. The taken image is transmitted to the upper position detection unit 600. Unlike the entrance/exit detection upper camera 200, each of the upper cameras 300 does not necessarily need to include the entrance/exit detection area 1 in a part of its imaging area. However, as a prerequisite, a plurality of upper cameras 300 need to be provided and each of them is arranged to share a part of its imaging area with a neighboring upper camera. To specify each of them in the following description, the plurality of the upper cameras 300 are referred to as an upper camera 300a, an upper camera 300b, . . . , and an upper camera 300x by adding reference signs.

The face detection unit 500 performs face detection of a person being the imaging object 1000 from the image received from the entrance/exit detection camera 100 and transmits the positional coordinates in the image of the detected face to the initial position estimation unit 700. Then, the face detection unit 500 extracts the detected face in the image as a rectangle region. The positional coordinates of the detected face to be transmitted to the initial position estimation unit 700 is determined, for example, as the positional coordinates of the center of the upper side of the rectangular, which is formed by the four tangents in touch with the contour of the detected face. From the positional coordinates received by the initial position estimation unit 700, the height of the imaging object 1000 is obtained because the positional coordinates received is that of the center of the top side of the detected rectangle. Here, the "height of the imaging object 1000" is the height of the person detected. Detection of a face from an image is possible on the basis of a publicly-known technique such as the extraction of Haar-Like characteristics. To be more specific, face detection from an image is possible by combining a plurality of the Haar-Like filters, each being a detector to output the difference in the aggregate brightness values between the adjacent rectangular areas. Even in a case where the face itself cannot be detected for some reason, such as that only an image from the back is available or the face is covered by a mask or a helmet, if the facial region can be extracted anyhow and the corresponding rectangle can be defined in the same manner as in a case a face itself is detected, the positional coordinates can be obtained and transmitted to the initial position estimation unit 700.

The upper position detection unit 600 performs batch processing to detect a person's head from a plurality of the images of a moving person received from the entrance/exit detection upper camera 200 or the upper cameras 300, and transmits the positional coordinates of the head, which is a two-dimensional coordinates in the image, to the tracking unit 900. That is, the upper position detection unit 600 detects the position of the imaging object 1000 when seen from the upper side on the basis of the images taken by the entrance/exit detection upper camera 200 or the upper cameras 300. For the person's head detection, a publicly-known technique to detect a moving object can be used. The technique includes: a combined use of a background subtraction and an ellipse detection; a calculation of frame difference; and a calculation of optical flow. The "background subtraction method" compares a current image being observed and a previous image to extract an object not existing in the previous image. The "optical flow" is used to represent the movement of an object in vector form in a visual expression such as time-continuous digital images. The positional coordinates that are two-dimensional coordinates are positional coordinates on a two-dimensional plane parallel to the floor.

The initial position estimation unit 700 converts the positional coordinates of the face obtained in the image received from the face detection unit 500 into three-dimensional coordinates in the target imaging space on the basis of the positional relationship between the entrance/exit detection camera 100 and the entrance/exit detection area 1, estimates the initial position of the imaging object 1000 as being the converted coordinates, and transmits the estimated initial position of the imaging object 1000 to the initial motion path generation unit 800. That is, the initial position estimation unit 700 estimates the initial position of the imaging object 1000 on the basis of the positional coordinates of the imaging object 1000 in the two-dimensional image taken by the entrance/exit detection camera 100 and the three-dimensional coordinate information of the entrance/exit detection area 1. The coordinates of the initial position is the three-dimensional coordinates at which the imaging object 1000 starts to position itself in the target imaging space. The coordinates of the initial position can be obtained by calculating the intersection where the extension of the line passing both the positional coordinates of the imaging object 1000 in the image taken by the entrance/exit detection camera 100 and the view point of the entrance/exit detection camera 100 being the position from which the entrance/exit detection camera 100 takes the image meets a plane defined in the entrance/exit detection area 1.

Next, how the initial position estimation unit 700 performs a three-dimensional coordinate transformation will be described. Here, it is assumed that the initial position estimation unit 700 knows camera parameters of the entrance/exit detection camera 100 and has the three-dimensional coordinate information of the entrance/exit detection area 1 in the target imaging space.

First, the camera parameters of the entrance/exit detection camera 100 will be described. With regard to a camera whose projection process follows a perspective projection model and image distortion caused by the lens is negligible, it is generally known that, when the three-dimensional coordinates of a specific point in an imaging space is given as (x, y, z) and the point (x, y, z) is projected to a positional coordinates (u, v) in an image, the correspondence relation between (x, y, z) and (u, v) can be expressed by the following two equations.

[Expression 1]

$$u = \frac{p00 \times x + p01 \times y + p02 \times z + p03}{p20 \times x + p21 \times y + p22 \times z + p23} \quad (1)$$

[Expression 2]

$$v = \frac{p10 \times x + p11 \times y + p12 \times z + p13}{p20 \times x + p21 \times y + p22 \times z + p23} \quad (2)$$

The twelve coefficients $p_{00}$ to $p_{23}$ in Formula (1) and Formula (2) can be calculated by the following procedures: (a) taking an image, using the entrance/exit detection camera 100, of each of at least six points whose respective positions in the target imaging space are premeasured; (b) obtaining the positional coordinates of each point in the taken image; and (c) solving the simultaneous equations including the twelve variables obtained by applying the coordinates to the above described two equalities. The denominators of Formula (1) and Formula (2) are the same. The coefficients $p_{00}$ to $p_{23}$ include information on the projection center position, the imaging direction of the camera in the target imaging space, and the focal length, as well as the pixel size in the taken image and the image center position. In the following description of the present invention, the coefficients $p_{00}$ to $p_{23}$ are collectively called camera parameters. As described above, the correspondence relation between the position of a point in the three-dimensional space and the position of the same point in an image taken by a camera is a pseudo-linear transformation determined by the parameters that includes a position, attitude, focal length, and pixel size of a camera. Therefore, these camera parameters can be determined by solving the simultaneous equations based on the correspondence relation between the two known points.

Next, the three-dimensional information of the entrance/exit detection area 1 will be described. It is generally known that a plane in a three-dimensional space can be expressed by the following formula.

[Expression 3]

$$ax+by+cz=0 \quad (3)$$

Therefore, Formulas (1), (2), and (3), altogether, can provide a set of three simultaneous equations involving three unknown variables when (u, v), coefficients $p_{00}$ to $p_{23}$, and coefficients a to c are all known. In order for this to happen, however, it is necessary to perform a measurement in advance so as to be able to express, in the target imaging space, the plane that includes the entrance/exit detection area 1 by the parameters a to c. In other words, (x, y, z) can be determined.

The entrance/exit detection camera 100 takes an image covering the entrance/exit detection area 1, so that every person entering the target imaging space through the entrance/exit detection area 1 will be captured in an image taken by the entrance/exit detection camera 100 when passing through the plane including the entrance/exit detection area 1. By using Formulas (1), (2) and (3), therefore, the positional coordinates in the taken image can be converted into the corresponding three-dimensional positional coordinates in the three-dimensional space.

If the entrance/exit detection area 1 is out of the coverage of the imaging area of the entrance/exit detection camera 100, any of the points in the positional coordinates in the image taken by the entrance/exit detection camera 100 do not correspond to any of the coordinates in the three-dimensional space of the region in the plane representing the entrance/exit detection area 1. Therefore, as stated above, coverage of the entrance/exit detection area 1 within the imaging area of the entrance/exit detection camera 100 is a prerequisite for the configurations of the present invention.

On the basis of the image of the head of an imaging object 1000 taken by the entrance/exit detection upper camera 200, the initial motion path generation unit 800 associates the coordinates detected by the upper position detection unit 600 with the three-dimensional coordinates of the initial position of the imaging object 1000. The point represented by the detection coordinates of the upper position detection unit 600 associated with the three-dimensional coordinates of the initial position of the imaging object 1000 is defined as a starting point of the initial motion path. The position of the coordinates closest to the starting point, from among the coordinates representing a detected position of the head, is linked to the starting point to generate an initial motion path. In other words, the initial motion path generation unit 800 determines the position of the imaging object 1000 corresponding to the initial position of the imaging object 1000 as the starting point of the initial motion path and generates the initial motion path by linking the position closest from the starting point among the positions of the imaging object 1000. The generation of the initial motion path involves storing, in the motion path storage unit 950, the three-dimensional coordinates of both the starting point and the position closest from the starting point. The time at which the entrance/exit detection upper camera 200 takes the image of the imaging target 1000, the ID of the imaging target 1000, and the like are also stored in the motion path storage unit 950 as the motion path information.

The tracking unit 900 searches the three-dimensional coordinates closest from the positional coordinates stored last in the motion path storage unit 950 using the coordinates that are detected by the upper position detection unit 600 through capturing by the entrance/exit detection upper camera 200 and the upper cameras 300, and stores the searched positional coordinates of the imaging object 1000 in the motion path storage unit 950. Also, the tracking unit 900 adds positional coordinates of the imaging object 1000 to the initial motion path to generate a following motion path. To be specific, the terminus position shown by the three-dimensional coordinates of the initial motion path is linked to the position shown by coordinates of the head of the imaging object 1000 that is the closest to the terminus position of the initial motion path to generate the following motion path. The motion paths following the initial motion path are generated by linking the terminus position of the motion path to the position of the coordinates of the head of the closest imaging object 1000. In that sense, the initial motion path is an initial state of the motion paths.

The motion path storage unit 950 stores the initial motion path information received from the initial motion path generation unit 800 and transmits the stored motion path information to the tracking unit 900. The motion path storage unit 950 stores again the motion path information added by the tracking unit 900. It can be said, in other words, that the tracking unit 900 generates a fresh motion path by adding new coordinates of the head of the imaging object 1000 to the previous motion path. In addition, the initial motion path information is a first part of the motion path information, that is, a part of the motion path information. The motion path information will be detailed in the description of the motion path storage unit 950.

The display device 1100 shows the motion path information stored in the motion path storage unit 950 to a user by creating an image projected on a two-dimensional map and viewed from the upper side of the target imaging space.

Figure 3:
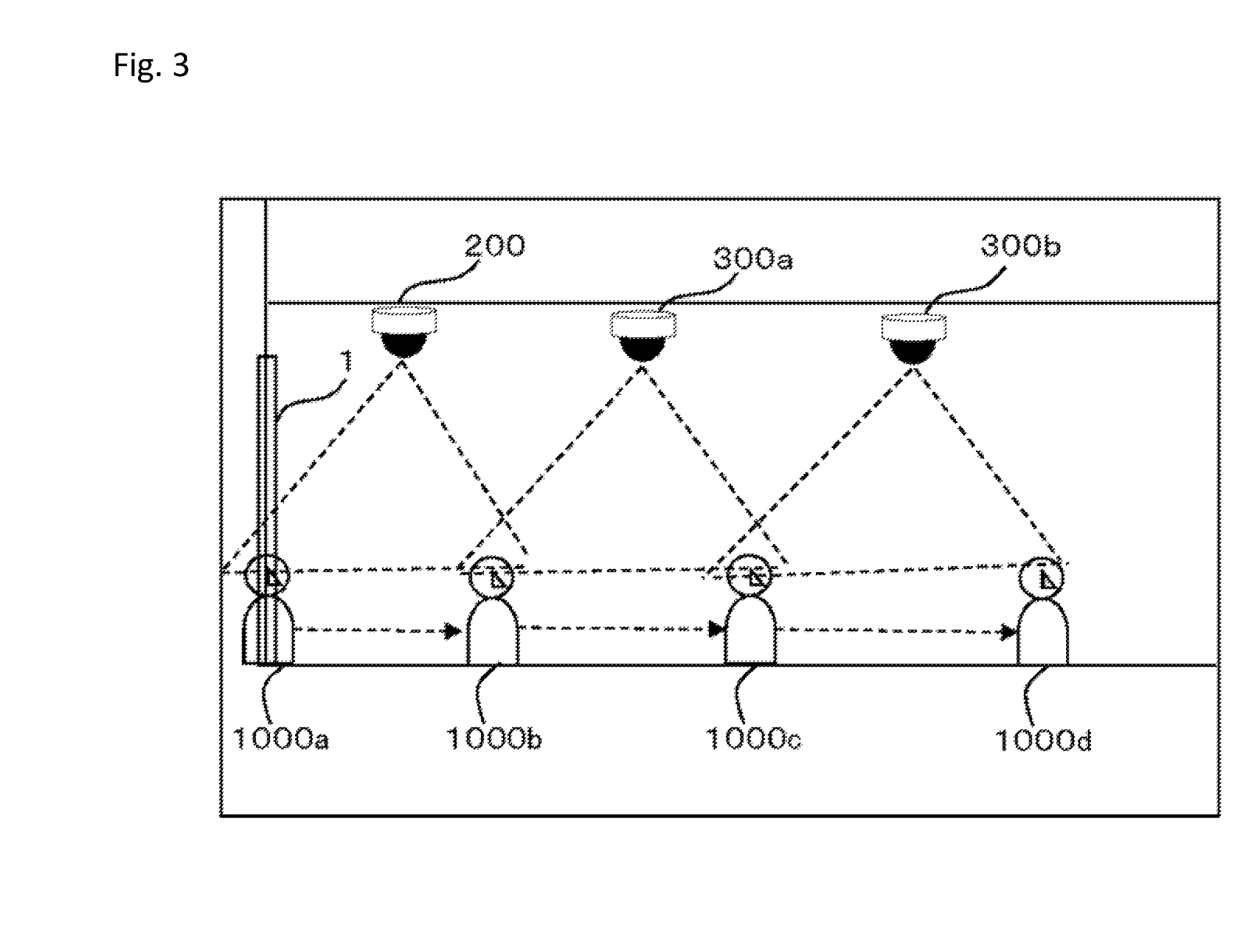
FIG. 3 is a side view of an area showing an overlapping arrangement of the imaging areas of the entrance/exit detection upper camera and the upper cameras according to Embodiment 1 of the present invention.
Figure 4:
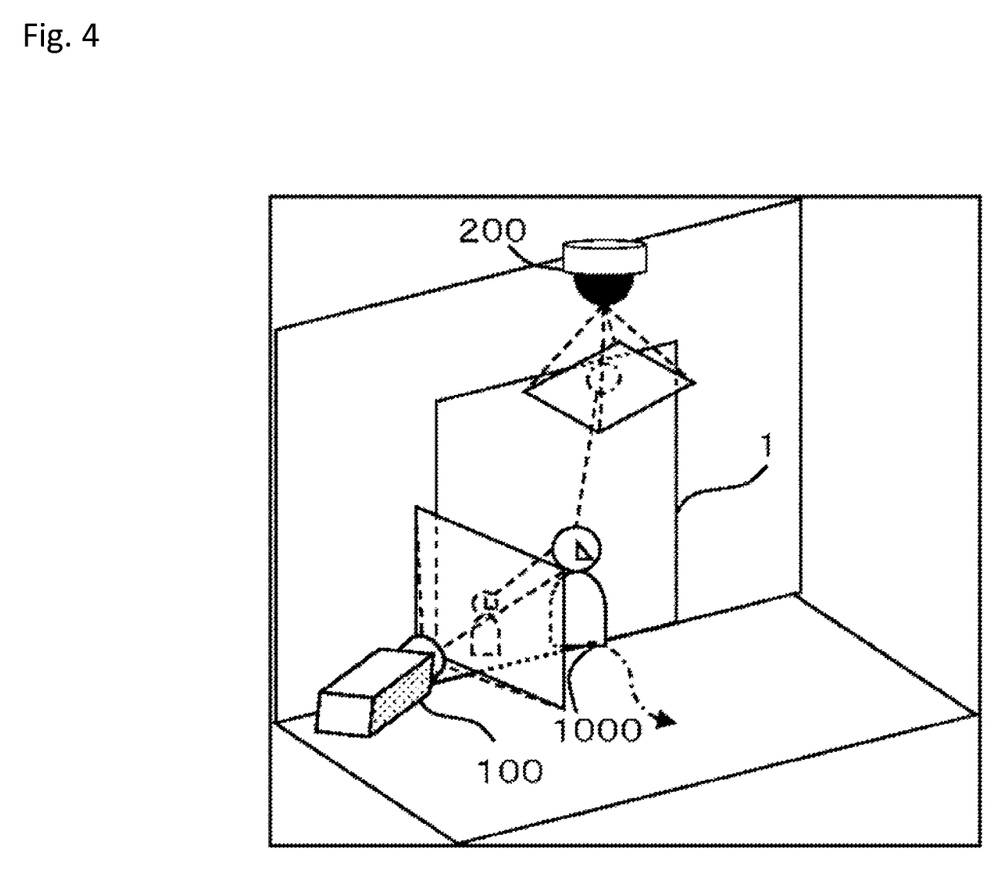
FIG. 4 is an explanatory diagram of an overlapping arrangement of the imaging areas of the entrance/exit detection camera and the entrance/exit detection upper camera.

As mentioned above, FIG. 2 shows an installation arrangement, according to Embodiment 1 of the present invention, of the entrance/exit detection camera 100, the entrance/exit detection upper camera 200, and the upper cameras 300, where the three-dimensional coordinate axes in the target imaging space are shown as x-axis, y-axis, and z-axis. The x-axis represents the depth direction in the target imaging space. The y-axis represents the direction perpendicular to the height direction and parallel to the entrance/exit detection area 1 in the target imaging space. The z-axis represents the height direction in the target imaging space. Also, in FIG. 2, the position coordinate axes in an image taken by the entrance/exit detection camera 100 are shown as u axis and v-axis. The u axis represents the horizontal direction in an image taken by the entrance/exit detection camera 100. The v-axis represents the vertical direction in an image taken by the entrance/exit detection camera 100. FIG. 3 is a side view showing an overlapping arrangement of the imaging areas of the entrance/exit detection upper camera 200 and the upper cameras 300 according to Embodiment 1 of the present invention. FIG. 4 is an explanatory diagram of an overlapping arrangement of the imaging areas of the entrance/exit detection camera 100 and the entrance/exit detection upper camera 200. The essential requirements for the present invention are as follows. (a) The imaging area of the entrance/exit detection camera 100 covers at least the entire entrance/exit detection area 1; (b) The entrance/exit detection upper camera 200 covers the entrance/exit detection area 1 as the entrance/exit detection camera 100 does, as shown for (a) and (b) in FIG. 4; and (c) The edge in the imaging area each taken by the entrance/exit detection upper camera 200 and the upper cameras 300 overlaps in the cameras arranged next to each other as shown in FIG. 3. Therefore, the requirement for tracking an imaging object is that entrance/exit detection upper camera 200 and the entrance/exit detection camera 100 have to share the imaging area at least in the entrance/exit detection area 1. Also, the requirement for tracking an imaging object is that the two separate cameras, namely the entrance/exit detection upper camera 200 and the entrance/exit detection camera 100, detect the same imaging object 1000. In FIG. 2 and FIG. 3, the imaging object 1000*a*, the imaging object 1000*b*, the imaging object 1000*c*, and the imaging object 1000*d* are of the imaging object 1000 whose image is taken at a different time.

Here, the motion path information stored in the motion path storage unit 950 will be described. The motion path information includes a group of positional coordinates recorded in time series, the order thereof in the time series, an ID of the corresponding imaging object 1000, and the time when the imaging object 1000 is detected last. Note that, regarding the ID of the imaging object 1000, an ID is obtained by selecting one freely from those not in use after checking IDs used in the motion path storage unit 950. The motion path storage unit 950 stores information on a plurality of the motion paths so as to be able to distinguish them by the IDs of the imaging objects 1000 and transmits by the request, the motion path information in response to a request from the initial motion path generation unit 800 or the tracking unit 900.

FIG. 5 is a table showing an example of the motion path information. In this example, N pieces of motion path information are stored. In FIG. 5, each item (item number) is followed to the right by the data contents, the data format, and the data size. The data contents are information such as the number N of the motion path information (the number N of motion paths), and information on the starting addresses of motion paths (motion path IDs), or information on motion path IDs. The data format is such data as positive integer 16 bit (unsigned int 16 bit), positive integer 32 bit (unsigned int 32 bit), and floating point (float). The data size is such data as "2" for 16 bit and "4" for 32 bit, with 8 bit set as the unit. The item number 2 includes the number N of the motion paths. In the item numbers "3" to "N+2" in the table, information indicating the starting address of each motion path is included. As the data content, the item number "N+3" includes the ID of the imaging object 1000 corresponding to its first motion path; the item number "N+4" includes the number of the positional coordinates included in the first motion path; and the item number "N+5" includes the last update time, or the end time when positional coordinates are added to the first motion path. Note that "the last update time", mentioned above, is also the time when the imaging object 1000 is detected last. In the example shown in this table, the number of the positional coordinates included in the first motion path is $m_1$. The item numbers "N+6" to "N+3+3×$m_1$+2" are listing $m_1$ three-dimensional coordinates in the chronological order of their addition. The item number "N+3+3×$m_1$+3" and the followings item numbers are a listing in which the motion path information the same as provided by the item numbers "N+3" to "N+3+3×$m_1$+2" is repeated until the motion path information corresponding to N motion paths reaches its end.

Figure 6:
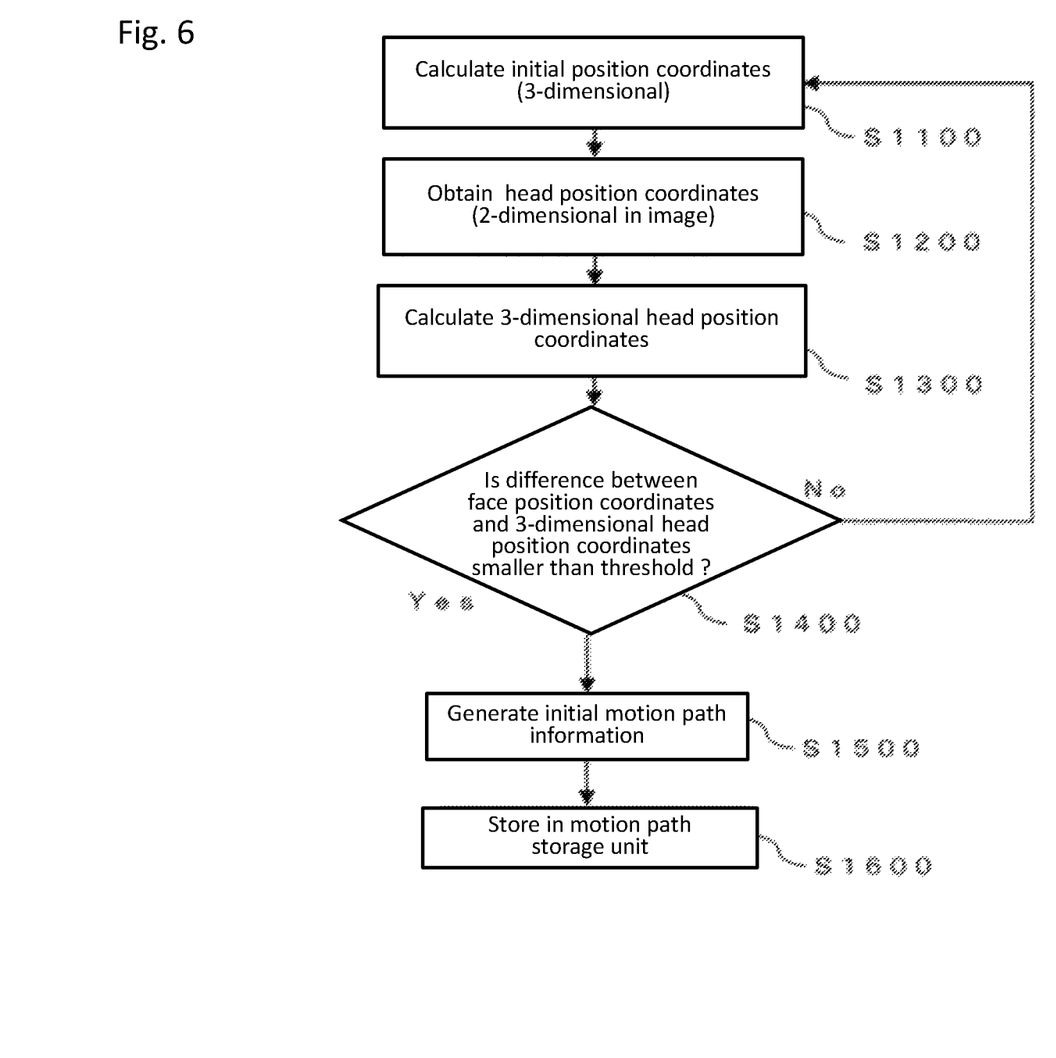
FIG. 6 is a flowchart showing a flow of initial motion path generation processing.

Next, how the initial motion path generation unit 800 performs the three-dimensional coordinate transformation will be described. FIG. 6 is a flowchart showing a flow of the initial motion path generation. The flowchart includes the processes from estimation of the three-dimensional positional coordinates by the initial position estimation unit 700 to generation of the initial motion path information by the initial motion path generation unit 800. It is assumed that the camera parameters $p_{00}$ to $p_{23}$ of the entrance/exit detection camera 100 are already determined by the initial position estimation unit 700 and the camera parameters $p_{00}$ to $p_{23}$ of the entrance/exit detection upper camera 200 are already determined by the initial motion path generation unit 800.

In Step S1100, the initial position estimation unit 700 converts the positional coordinates of the face, in the image, received from the face detection unit 500 into the three-dimensional coordinates in the target imaging space on the basis of the positional relationship between the entrance/exit detection camera 100 and the entrance/exit detection area 1, obtains the converted coordinates of the initial position of the imaging object 1000, and transmits the coordinates to the initial motion path generation unit 800. In Step S1200, the upper position detection unit 600 obtains the head position coordinates (u, v) in the two-dimensional image taken by the entrance/exit detection upper camera 200 and transmits the head position coordinates (u, v) to the initial motion path generation unit 800. Receiving the head position coordinates in the previous step, the initial motion path generation unit 800 converts, in Step S1300, the head position coordinates (u, v) in the two-dimensional image into the corresponding three-dimensional coordinates by using the three-dimensional coordinates and the head position coordinates both obtained from the positional coordinates of the imaging object 1000 in the two-dimensional image taken by the entrance/exit detection camera 100 and the three-dimensional coordinate information of the entrance/exit detection area 1.

As describe above, when the factors (u, v), $p_{00}$ to $p_{23}$, and a to c are all known, Formulas (1), (2), and (3) can provide the head position as the three-dimensional coordinates (x, y, z).

In Step S1400, the distance between the two dimensional positional coordinates (x, y), derived from provisional three-dimensional coordinates and the two dimensional positional coordinates (x, y), indicating the face position obtained in the entrance/exit detection camera 100, is calculated. If the distance is small enough, for example, the Euclidean distance thereof is smaller than a predetermined threshold, the provisional three-dimensional coordinates are set as the terminus three-dimensional coordinates, by determining that the two sets of the coordinates represent the position of the same imaging object. The threshold may be determined from, for example, the shoulder width of a person. If the Euclidean distance is larger than the threshold, the process returns to Step S1100 to detect another initial position, by judging that the two sets of the coordinates are those of different imaging objects.

In Step S1500, the three-dimensional coordinates of the terminus head position detected by the upper position detection unit 600 and the three-dimensional coordinates of the initial position of the imaging object 1000 are associated with each other. Then, the detection coordinates in the upper position detection unit 600, associated with the three-dimensional coordinates of the initial position of the imaging object 1000, are set as the starting point of the initial motion path. The initial motion path is generated by linking the position of the coordinates that is closest from the starting point, from among the detected head's coordinates, to the starting point. In Step S1600, the three-dimensional coordinates closest to the starting point are stored in the motion path storage unit 950.

Figure 7:
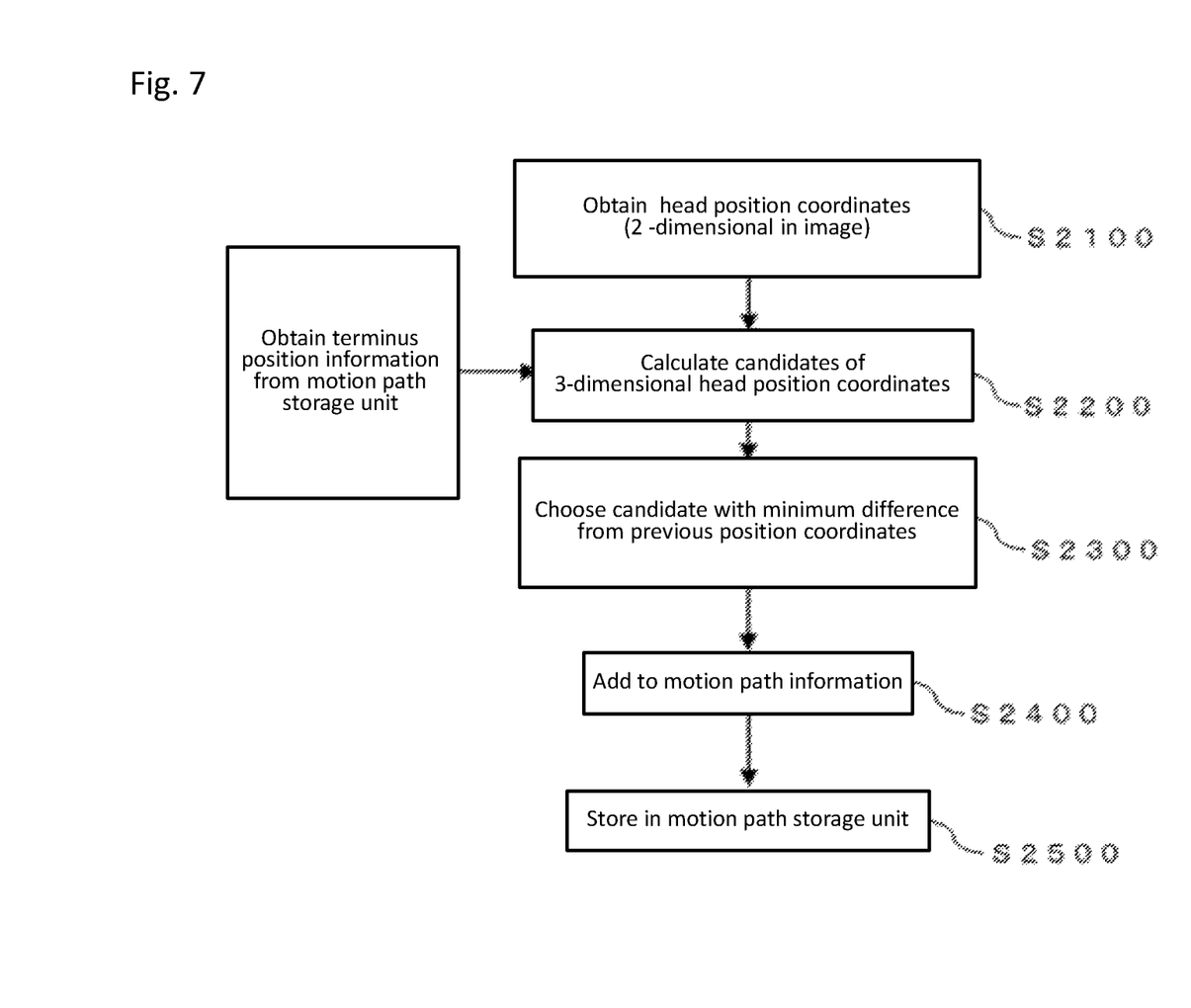
FIG. 7 is a flowchart showing a flow of tracking processing.

FIG. 7 is a flowchart showing a flow of the tracking process. With this flowchart, how the tracking unit 900 performs three-dimensional coordinate transformation will be described. This flowchart shows a flow of the process of associating the images taken by the upper cameras 300 with the motion path information stored in the motion path storage unit 950 to update the motion path information. First, in Step S2100, the tracking unit 900 obtains, out of the motion path information stored in the motion path storage unit 950, the terminus position coordinates (three-dimensional coordinates) that are the closest, two-dimensionally, to the two-dimensional coordinates that are detected by the upper position detection unit 600 using taken images by the entrance/exit detection upper camera 200 or the upper cameras 300. If the motion path storage unit 950 includes information on N motion paths, the N number of z coordinates are obtained with respect to the z coordinates of the three-dimensional coordinates obtained. Then, the last three-dimensional coordinates of the imaging object 1000 is the N-th coordinates.

Next, in Step S2200, on the basis of the head position coordinates (u, v) in the two-dimensional images of the taken images, detected by the upper position detection unit 600, the tracking unit 900 calculates, as performed in Step S1300, the N number of the coordinates (x, y, z) by using Formulas (1), (2) and as the n number of z coordinates obtained. If the upper cameras 300 take images according to the perspective projection model, the three-dimensional coordinates (x, y, z) can be calculated from each of the z coordinates by using the same method as used in Step S1300. Also, the description previously provided about the camera parameters of the entrance/exit detection upper camera 200 is also applicable to the camera parameters of the upper cameras 300.

Next, in Step S2300, the candidate coordinates that creates a minimum difference in the distances from the previous position coordinates are chosen. To be specific, the Euclidean distances are calculated between the three-dimensional coordinates, being a starting point, obtained from the motion path storage unit 950 and each of the N number of the coordinates (x, y, z) calculated and, then, a pair of the coordinates that creates the smallest Euclidean distance are extracted. Next, in Step S2400, the result is added to the motion path information. To be specific, the coordinates (x, y, z) obtained by calculation, being one of the extracted pairs, are added as the updated three-dimensional coordinates along with the detection time information to the motion path information obtained from the motion path storage unit 950 by extraction, being the other of the extracted pairs. In Step S2500, the result is stored in the motion path storage unit 950. That is, the updated motion path information is restored in the motion path storage unit 950.

Here, the conditions for the three-dimensional installation arrangement of the upper cameras 300 to ensure the processing of the tracking unit 900 will be described. Now, it is assumed that the terminus position of the motion path information is taken by the upper camera 300a and the location of the terminus position is at an edge of the imaging area of the upper camera 300a. There, it is also assumed that the upper camera 300b, a separate camera different from the upper camera 300a, which shares an edge of its imaging area with the upper camera 300a, has also detected the imaging object 1000 corresponding to the motion path information obtained by the upper camera 300a at the end time, being the last update time of the motion path.

In such a case, the imaging object 1000 moving out from the imaging area of the upper camera 300a at the next detection time is highly likely to be detected by the upper camera 300b. The following head detection of the imaging object 1000 performed by the upper camera 300b at the next detection time will make it possible to update the motion path information and, thus, to continue the tracking of the imaging object 1000. That is, in the present invention, overlapping of the imaging areas, as shown in FIG. 3, between the upper cameras 300 in which at least the image of the head of the imaging object 1000 can be taken in any two of the upper cameras 300 is a prerequisite to be able to track the imaging object 1000 sequentially from one upper camera 300 to another.

As so far described in Embodiment 1, the generation of the motion path is performed by tracking the imaging object 1000. The processes described as the flowcharts shown in FIG. 6 and FIG. 7 make it possible to perform the sequential tracking of the three-dimensional position of the imaging object 1000 in the target imaging space.

Note that, in Step S2300, the one having the shortest distance to the three-dimensional coordinates from the previous position coordinates being the positional coordinates obtained from the motion path storage unit 950 at the previous time is selected. The predicted destination coordinates may be calculated on the basis of the previous positional coordinates, another previous positional coordinates of one step prior to the previous positional coordinates, and the their time difference, and a candidate having the smallest distance from these may be set as a new destination coordinates.

It was described above that, in Step S2300, the three-dimensional coordinates closest in distance from the previous position coordinates were to be chosen. It may also be possible to identify the destination coordinates by performing the following steps. First, the positional data of the points of the previous positional coordinates and the three-dimensional coordinate candidates are returned to the original upper camera images. Secondly, the color information of the nearby area corresponding to each of the points in the images is extracted. Lastly, the three-dimensional coordinate candidate that is the closest in the extracted color information to the previous position coordinates is chosen. This method is more effective in stabilizing the object tracking across the entrance/exit detection upper camera 200 and the upper cameras 300.

For example, in Patent Document 1, the detection results obtained from a plurality of cameras are continuously integrated by the visual volume intersection method, whereby the position of the imaging object is estimated and the motion path information of the imaging object is generated. Therefore, if an imaging object cannot be captured by multiple cameras, false recognition of a person and its motion path may occur. In the present invention, even in an imaging area not shared by multiple cameras, the three-dimensional coordinate information, including the height information, is still available from an image of the imaging object taken by a single camera. Therefore, the three-dimensional coordinates of a position occupied by the imaging object in the target imaging space is always estimable. Thus, the movement of a person can be effectively converted into a correct motion path even with a fewer number of cameras installed than the number required to cover an imaging object with multiple cameras all the time.

The face detection unit 500, the upper position detection unit 600, the initial position estimation unit 700, the initial motion path generation unit 800, the tracking unit 900, and the motion path storage unit 950 may be implemented by a dedicated arithmetic circuit(s) or a program(s) executed by a general purpose computer. In a case of a program(s), the face detection unit 500, the upper position detection unit 600, the initial position estimation unit 700, the initial motion path generation unit 800, the tracking unit 900, and the motion path storage unit 950 may be run on different computers or on a single computer.

In the present embodiment, the entrance/exit detection upper camera 200 and the upper cameras 300 are the same or equivalent cameras as used for the entrance/exit detection camera 100.

However, if a camera in which image distortion caused by the lens is not negligible, as is the case with a fisheye lens camera, is used for the entrance/exit detection upper camera 200 or the upper cameras 300, first, the positional coordinates in an image are converted to distortion-free coordinates by distortion correction, and then, Formulas (1) and (2) are applied to the converted coordinates. In a projection model of a fisheye camera, when the angle of incidence into the optical axis is ☐ and the distance from the optical axis center in an image is r, the relation between the angle and the distance can be expressed by Formula (4).

[Expression 4]

$$r = k_1 \times \theta + k_2 \times \theta^2 + k_3 \times \theta^3 + k_4 \times \theta^4 + k_5 \times \theta^5 \qquad (4)$$

The coefficients k1 to k5 can be obtained from the correspondence relations between the points each position of which is known in the three-dimensional space and the positional coordinates of these points in the two-dimensional images taken by the fisheye camera. At the same time, with the camera parameters such as a position, attitude, focal length, and pixel size included together, a bird's-eye view with low distortion and displacement can be generated.

As described so far, in the present invention, three-dimensional coordinates of an imaging object 1000 in the target imaging space are first estimated from the positional relationship between the entrance/exit detection camera 100 and the entrance/exit detection area 1. Further, even in a part of the imaging area which cannot be shared by multiple cameras, the coordinate information of the imaging object 1000 can continue to be provided by a single camera in charge of the unshared space. By taking such advantages, an imaging object tracking system which can monitor an area of surveillance with fewer cameras can be provided.

In the present embodiment, it is described that a single upper position detection unit 600 serves for all of the upper cameras 300. Instead, each of the upper cameras 300 may have an upper position detection unit 600 to serve only for it. This configuration is effective for faster head detection because the load of the head detection required for each of the entrance/exit detection upper camera 200 and the upper cameras 300 is distributed to each of the upper position detection units 600.

If an imaging object 1000 is limited to a person, infrared imaging cameras may be used as the entrance/exit detection upper sensor and the upper sensors in place of the entrance/exit detection upper camera 200 and the upper cameras 300. A person area in an infrared image taken by an infrared imaging camera is displayed as a region where the temperature is higher than the surrounding. Therefore, the person area can be extracted from the infrared image after subtraction of the background infrared image taken when no person is included, as described in the case of a normal camera. Further, if a round-shaped region or the like is detected in the person area, the region can be extracted as a person's head. This configuration is an improvement effective to detect only a person as the moving object.

Further, ToF (Time of Flight) cameras may be used as the entrance/exit detection upper sensor and the upper sensors in place of the entrance/exit detection upper camera 200 and the upper cameras 300. By comparison of the depth maps between including and not including the imaging object 1000, the ToF cameras makes it possible to detect, from the top, the relative position of the imaging object 1000 as two-dimensional coordinates. Note that "ToF" is an acronym of the technique for obtaining distance by measuring Time of Flight of light. A ToF camera outputs a depth image showing the depth from the camera center. A person area in a depth image taken by a ToF camera is displayed as a region where the depth is smaller than the surrounding. Therefore, in a depth image obtained after subtraction of the background depth image taken when no person is included, as obtained in the case of a normal camera, if a region where the depth is especially small is detected, the region can be extracted as a person's head. This configuration is an improvement effective to stabilize the detection of the imaging object 1000, compared with a normal camera.

In the embodiments described above so far, it is assumed that the entrance/exit detection upper camera 200 and the upper cameras 300 are all installed on the ceiling. The installation position, however, is not limited to positions on the ceiling. Any position from which a bird's eye view including the imaging object 1000 can be provided is good to install the cameras.

Each of the embodiments above is provided just as an example and the scope of the present invention is not limited to the examples.

REFERENCE SIGNS LIST

1 entrance/exit detection area
100 entrance/exit detection camera
200 entrance/exit detection upper camera
300 upper camera
500 face detection unit
600 upper position detection unit
700 initial position estimation unit
800 initial motion path generation unit
900 tracking unit
950 motion path storage unit
1100 display device

The invention claimed is:

1. An imaging object tracking system, comprising:
   an entrance/exit detection camera to take an image of an entrance/exit detection area where an imaging object enters and exits;
   an entrance/exit detection upper sensor installed to take an image of the imaging object from an upper side thereof and to detect the imaging object being imaged by the entrance/exit detection camera;
   at least one upper sensor installed to detect the imaging object from an upper side thereof and disposed so as to overlap a part of the detection area for detecting the imaging object with an area where the entrance/exit detection upper sensor detects the imaging object;
   an initial position estimating circuitry to estimate an initial position of the imaging object based on positional coordinates of the imaging object in a two-dimensional image taken by the entrance/exit detection camera and three-dimensional coordinate information of the entrance/exit detection area;
   upper position detecting circuitry to detect a position of the imaging object seen from an upper side thereof based on an image detected by the entrance/exit detection upper sensor or the at least one upper sensor;
   initial motion path generating circuitry to generate an initial motion path by linking a position of the imaging object corresponding to the initial position of the imaging object and a position closest in distance from the starting point from among the positions of the imaging object; and
   tracking circuitry to generate a following motion path by adding a position of the imaging object to the initial motion path.

2. The imaging object tracking system according to claim 1, further comprising a motion path storage to store the initial motion path generated by the initial motion path generating circuitry, output the initial motion path to the tracking circuitry, and store the following motion path generated by the tracking circuitry.

3. The imaging object tracking system according to claim 2, wherein the motion path storage records:
   information on a starting position of the motion path;
   information on an ID of the imaging object corresponding to the motion path;
   information on the number of positional coordinates included in the motion path; and
   information on a time when a position of the imaging object is added to the motion path last.

4. The imaging object tracking system according to claim 1, wherein each of the entrance/exit detection upper sensor and the at least one upper sensor is a visible light camera.

5. The imaging object tracking system according to claim 1, wherein each of the entrance/exit detection upper sensor and the at least one upper sensor is an infrared imaging camera.

6. The imaging object tracking system according to claim 1, wherein each of the entrance/exit detection upper sensor and the at least one upper sensor is a ToF camera.

7. The imaging object tracking system according to claim 1, wherein the initial position estimating circuitry estimates the initial position of the imaging object by converting the positional coordinates of the imaging object in the two-dimensional image taken by the entrance/exit detection camera into three-dimensional coordinates on a basis of the three-dimensional coordinate information of the entrance/exit detection area.

8. The imaging object tracking system according to claim 1, wherein the three-dimensional coordinate information of the entrance/exit detection area is premeasured.

9. An imaging object tracking method, comprising:
    taking an image of an entrance/exit detection area where an imaging object enters and exits;
    detecting the imaging object from an upper side thereof;
    estimating an initial position of the imaging object based on positional coordinates of the imaging object in a two-dimensional image taken in the taking of the image of the entrance/exit detection area and three-dimensional coordinate information of the entrance/exit detection area;
    detecting a position of the imaging object seen from an upper side thereof based on an image detected in the detecting of the imaging object;
    generating an initial motion path by linking a position of the imaging object corresponding to the initial position of the imaging object and a position closest in distance from the starting point from among the positions of the imaging object; and
    adding a position of the imaging object to the initial motion path.

10. The imaging object tracking method according to claim 9, wherein the estimating estimates the initial position of the imaging object by converting the positional coordinates of the imaging object in the two-dimensional image taken in the taking of the image of the entrance/exit detection area into three-dimensional coordinates on a basis of the three-dimensional coordinate information of the entrance/exit detection area.

11. The imaging object tracking method according to claim 9, wherein the three-dimensional coordinate information of the entrance/exit detection area is premeasured.

\* \* \* \* \*